United States Patent [19]

Staar

[11] 3,726,457

[45] Apr. 10, 1973

[54] TAPE CARTRIDGE PLAYBACK MECHANISM

[75] Inventor: Theophiel Clement Jozef Lodewijk Staar, Kraainem, Belgium

[73] Assignee: Staar, S. A., Brussels, Belgium

[22] Filed: Dec. 28, 1971

[21] Appl. No.: 212,928

[30] Foreign Application Priority Data

Feb. 26, 1971 Belgium ........................... 763,520

[52] U.S. Cl. ................ 226/90, 274/4 E, 179/100.2 Z, 242/55.19

[51] Int. Cl. ............................................ G11b 15/66

[58] Field of Search .................. 179/100.2 Z; 242/55, 242/55.19; 274/11 D, 11 B, 11 R, 4 B, 4 E; 226/168, 90, 181, 187, 191

[56] References Cited

UNITED STATES PATENTS

| | | | |
|---|---|---|---|
| 3,420,461 | 1/1969 | Cousino | 179/100.2 Z X |
| 3,627,185 | 12/1931 | Trammell | 226/90 |

*Primary Examiner*—Allen N. Knowles
*Assistant Examiner*—Gene A. Church
*Attorney*—C. Frederick Leydig et al.

[57] ABSTRACT

A transport apparatus for magnetic tape stored in cartridges in which the tape is exposed through apertures in opposed principal side walls for cooperation with a tape guide, sound head and tape drive capstan, each of which is at a fixed location in said apparatus. The apparatus is adapted to slidingly receive one of said cartridges inserted inwardly edgewise to a first position wherein the exposed tape is approximately opposite the location of the tape guide, sound head and tape drive capstan, and is thereafter moved transversely toward a second position where the tape guide, sound head and tape drive capstan penetrate one wall of the cartridge into operative contact with the tape and the pressure roller penetrates the opposite principal wall to press against the tape and tape drive capstan.

17 Claims, 13 Drawing Figures

TAPE CARTRIDGE PLAYBACK MECHANISM

The present invention generally relates to transport apparatus for magnetic tape stored in cartridges and, more particularly, relates to transport apparatus for magnetic tapes stored in cartridges of the type in which the tape is exposed through apertures in opposed principal walls for cooperation with a tape guide, sound head and tape drive capstan, with the plane of the exposed tape being parallel to the principal walls of the cartridges, as described, for example, in Cousino U.S. Pat. No. 3,420,461. As described in that patent, the elements for guiding and driving the tape penetrate into the cartridge through apertures in both of the principal walls, substantially perpendicularly to the plane of the principal walls. It should be understood that the tape transport apparatus of the present invention is intended to be associated with electronic circuitry, speakers and the like, which comprise equipment that will record or playback signals on magnetic tape.

Since the tape guide, sound head and tape drive capstan must penetrate the principal walls of the cartridge being played, coupled with the fact that it is advantageous to have these elements at a fixed location in the apparatus designed to play the magnetic tape in this type of cartridge, it has been common practice in known prior art apparatus to insert a cartridge into the apparatus and thereafter rock or rotate the cartridge transversely about an axis parallel to the exposed portion of the tape. Thus, by moving the cartridge, the tape guide, sound head and tape drive capstan penetrate the apertures in the principal walls, and are thereby brought into operative contact with the tape being played.

In known prior art apparatus, this rocking or transverse movement of the cartridge is achieved by slidingly introducing a cartridge inwardly edgewise substantially in its own plane, whereupon it is acted upon by an inclined surface which, together with a resilient means, applies an increasing force opposing its inward movement into the apparatus. When the cartridge is inserted to substantially its ultimate depth, recesses in the principal wall of the cartridge on which the inclined surfaces act suddenly permit the resilient means to rock the cartridge into position wherein the tape is in operative contact with the sound head and the tape drive capstan.

A presser roller which together with the tape drive capstan forms a nip through which the magnetic tape passes and is thereby driven, must act on the opposite side of the tape than the tape drive capstan, and must therefore penetrate into the cartridge through the opposite principal wall. In known prior art apparatus, the presser roller is mounted on a movable arm which, as a result of manual or electromagnetic control, causes the arm and presser roller to come into operative position after the cartridge has been rocked into operative position vis-a-vis the tape drive capstan and sound head. The supply circuit of the motor driving the apparatus is closed by a switch actuated by the cartridge when it is in operative position and thus may be actuated even though the pressure roller is not in its operative position.

The resilient means acting on the forward edge of the cartridge in the direction opposing its inward movement is also effective to insure the inclined surfaces nest firmly within the recesses of the cartridge. The cartridge is removed from its operative position by being withdrawn from the plane in which it is operative, through a sufficient distance to disengage the inclined surfaces from the recesses of the cartridge.

As has been previously stated, the rocking movement of the cartridge occurs by virtue of the action of the resilient means which produce an increasing force upon the cartridge during its insertion into the apparatus. These resilient means must be sufficiently strong to rock the cartridge into its operative position and also maintain it in its operative position. It should be understood that the strength of these resilient means has the twofold disadvantage of interfering with the free movement of the cartridge when it is inserted in the apparatus and also making it difficult to remove the cartridge since the resilient means make it difficult to disengage the recesses from the steep walls that terminate the inclined surfaces of the apparatus.

Thus, the known prior art apparatus has the following disadvantages, viz: (1) the requirement of the additional manual introduction of the pressure roller after the cartridge has been rocked into its operative position; (2) the absence of synchronization of the introduction of the pressure roller except by the use of electromagnetic devices which generally consume considerable amounts of electric current and are relatively expensive; (3) the ability to close the circuit supplying the tape drive motor when the pressure roller is in a non-operative position; (4) the friction of the resilient means on the cartridge which impedes its insertion into the apparatus; and (5) the difficulty in disengaging the cartridge from its operative position.

Accordingly, it is a primary object of the present invention to provide a magnetic tape transport apparatus for the type of cartridges hereinbefore described, which apparatus overcomes the problems found with the known prior art constructions.

More specifically, it is an object of the present invention to provide a magnetic tape transport apparatus wherein a cartridge can be slidingly inserted edgewise to a first position having exposed tape approximately opposite the location of a tape guide, sound head and tape drive capstan, with the sliding movement to the first position being substantially unimpeded.

A related object is to provide such a magnetic tape transport apparatus wherein the cartridge, responsive to further inward incremental movement thereof, causes the cartridge to rock or move transversely and, in so doing, causes the tape guide, sound head, tape drive capstan and pressure roller to penetrate the cartridge and come into operative contact with the magnetic tape.

Still another object is to provide apparatus wherein the transverse or rocking movement of the cartridge actuates a switch which closes the supply circuit of the tape drive motor and thereby initiates the operation of the tape transport apparatus.

Yet another object of the present invention is to provide the apparatus with a rejecting mechanism which, subject to the pushing of a button or lever, disengages the cartridge by transversely moving or rocking it back to its first position thereby permitting the cartridge to be removed substantially without impediment or friction. A related object is to provide for automatic shut off of the apparatus responsive to the above opposite transverse movement.

Other objects and advantages of the present invention will become readily apparent upon reading the ensuing specification in conjunction with the attached drawings, in which.

Figure 1:
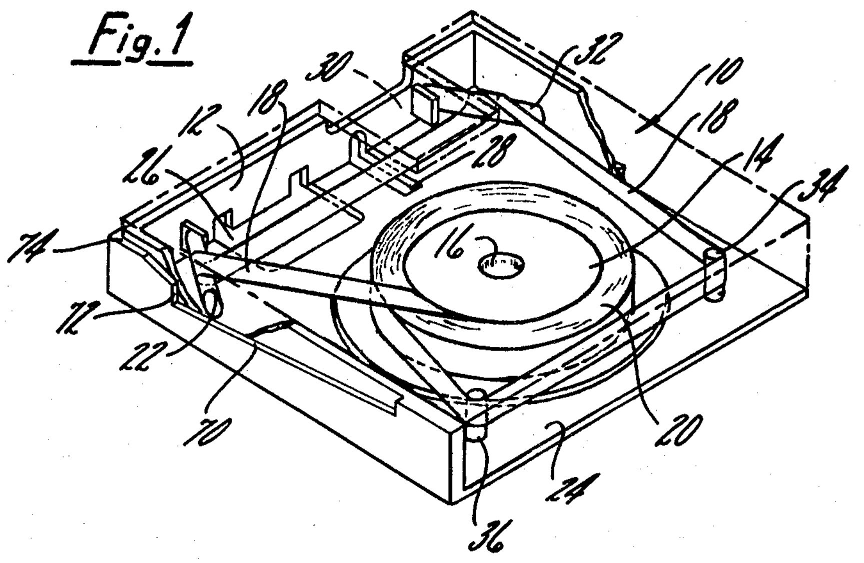
FIG. 1 is a perspective view illustrating the type of cartridge which is employed in the apparatus of the present invention.

Turning first to the construction of the type of cartridge for which the transport apparatus of the present invention is particularly suited, and referring to FIG. 1, the cartridge, indicated generally at 10, has a casing 12 in which there is contained a hub 14 adapted to turn about a spindle 16, and on which the magnetic tape 18 forms a winding 20. The magnetic tape 18 is drawn from the center of the winding 20 and moves, after having passed around a smooth cylindrical shaped rod 22 disposed obliquely in one corner of the casing, so that the tape is in a plane parallel to the base 24 of the casing 12 as the tape passes apertures 26 and 28 in the base and also an aperture 30 in a cover 32 (diagrammatically represented in phantom in FIG. 1). The apertures are adapted to permit the penetration of the sound head, tape guide and tape drive capstan, as well as the pressure roller, all of which are part of the apparatus of the present invention. After the tape has passed the apertures 26, 28, 30, it passes around a second obliquely disposed cylindrical rod 32 as well as perpendicular rods 34 and 36 before it returns to the winding 20 from which it originates. It should be understood that the magnetic tape follows a continuous route during operation, is of endless construction and therefore does not need to be reversed or rewound after being played. The overall configuration of the cartridge is shown to be generally thin, flat and square and the base 24 and cover define the principal walls or faces of the cartridge. The cartridge is inserted into the transport apparatus edgewise substantially in its own plane, with the end portion having the apertures 26, 28, 30 being initially inserted and penetrating the farthest distance inwardly of the apparatus when the cartridge is inserted therein. Other specific constructional features that are not disclosed in the Cousino patent will be described in the ensuing portions of the specification.

Figure 2:
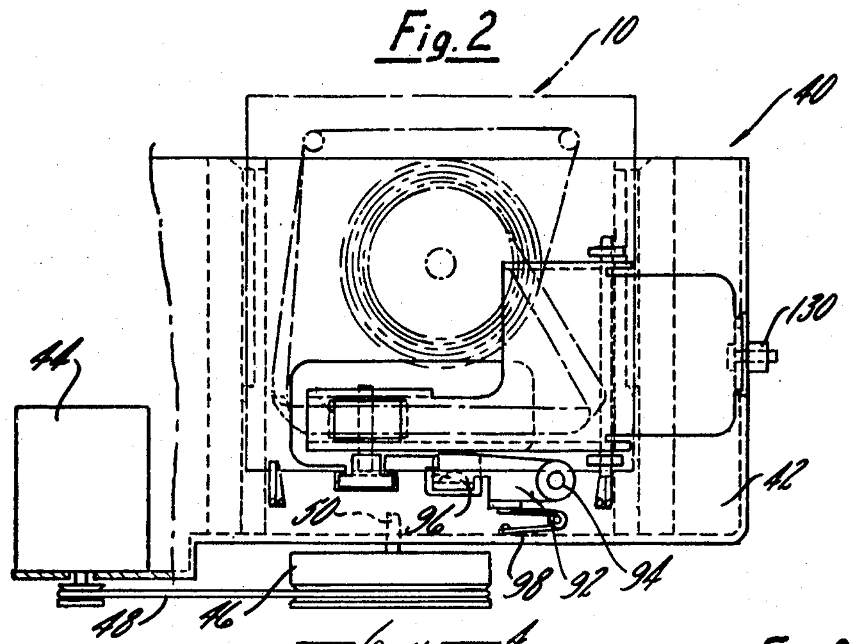
FIG. 2 is a side elevation illustrating the apparatus of the present
Figure 3A:
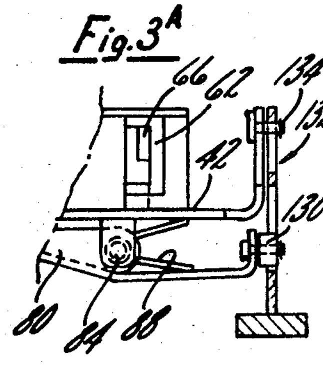
FIG. 3A is a fragmentary plan view illustrating a portion of the apparatus shown in FIG. 3, wherein the apparatus is in the operative position.
Figure 3:
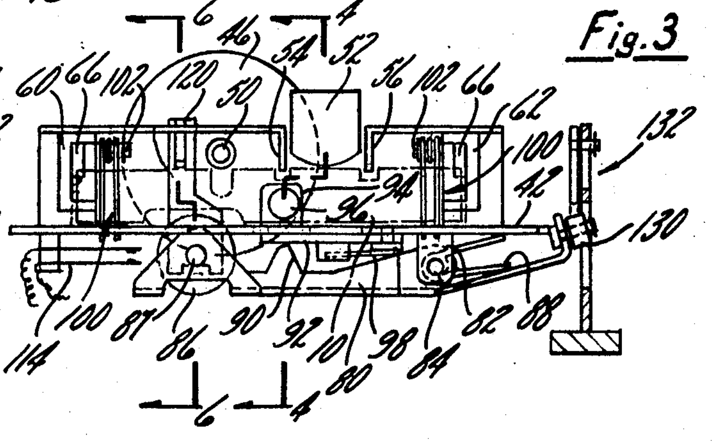
FIG. 3 is a top plan view of the apparatus shown in FIG. 2, the apparatus being in inoperative position for playing back a magnetic tape contained in the cartridge of FIG. 1.

Turning to the tape transport apparatus of the present invention and referring to FIGS. 2 and 3, the apparatus indicated generally at 40, includes a chassis 42 upon which a motor 44 is mounted which drives a fly wheel 46 by means of a belt 48. The fly wheel 46 is in turn connected to a tape drive capstan 50. The chassis 42 also has a sound head 52 (which may either record or pick up signals on the magnetic tape) and a pair of tape guides 54 and 56 mounted at a fixed location in the apparatus 40. As can be seen in FIG. 3, the tape guides 54 and 56 are on opposite sides of the sound head so that when the cartridge is inserted in the apparatus in operative position to be played, the tape guides precisely position the magnetic tape when it passes the sound head and thus insures quality reproduction or recordation of the signal on the magnetic tape. Since the tape may have from one to four sound tracks and may be less than approximately one-fourth inches wide, it is important that the tape be accurately positioned when it passes by the sound head.

Broadly stated, the apparatus of the present invention permits the cartridge to be inserted edgewise substantially in its own plane to a first position wherein the magnetic tape exposed through the apertures 26, 28, 30 is approximately opposite the location of the tape guide, sound head and tape drive capstan which are at fixed locations in the apparatus. When the cartridge is in the first position shown in FIG. 5, the sound head, tape drive capstan and tape guide do not penetrate the corresponding apertures and the magnetic tape is not in contact with these elements and the cartridge is therefore not in operative position to be played.

Figure 4:
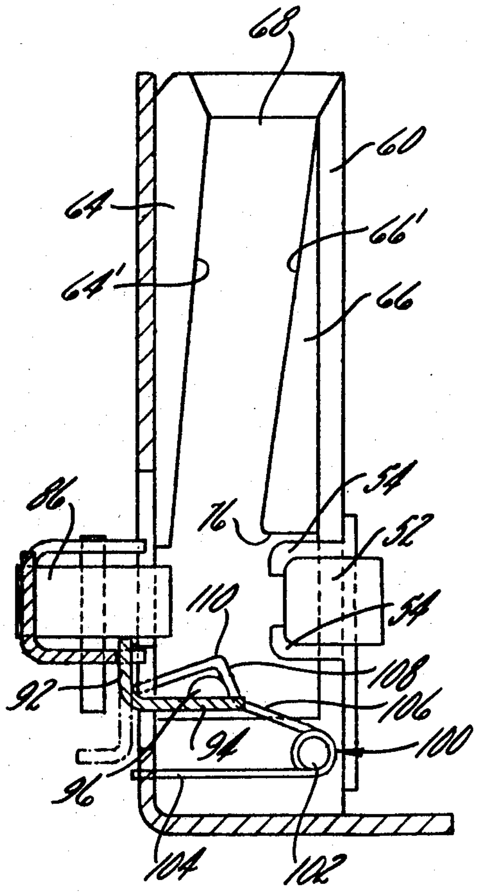
FIG. 4 is a sectional view of the apparatus shown in FIG. 3 and is taken generally along the line 4—4 of FIG. 3.
Figure 5:
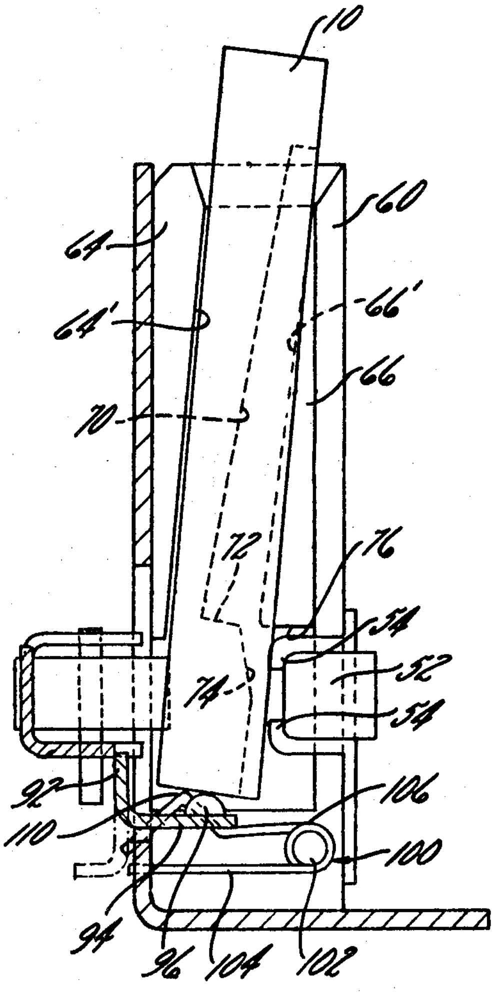
FIG. 5 is a similar sectional view of the apparatus shown in FIG. 4, and particularly illustrating the apparatus after the insertion of a cartridge therein.
Figures 6, 7, 8:
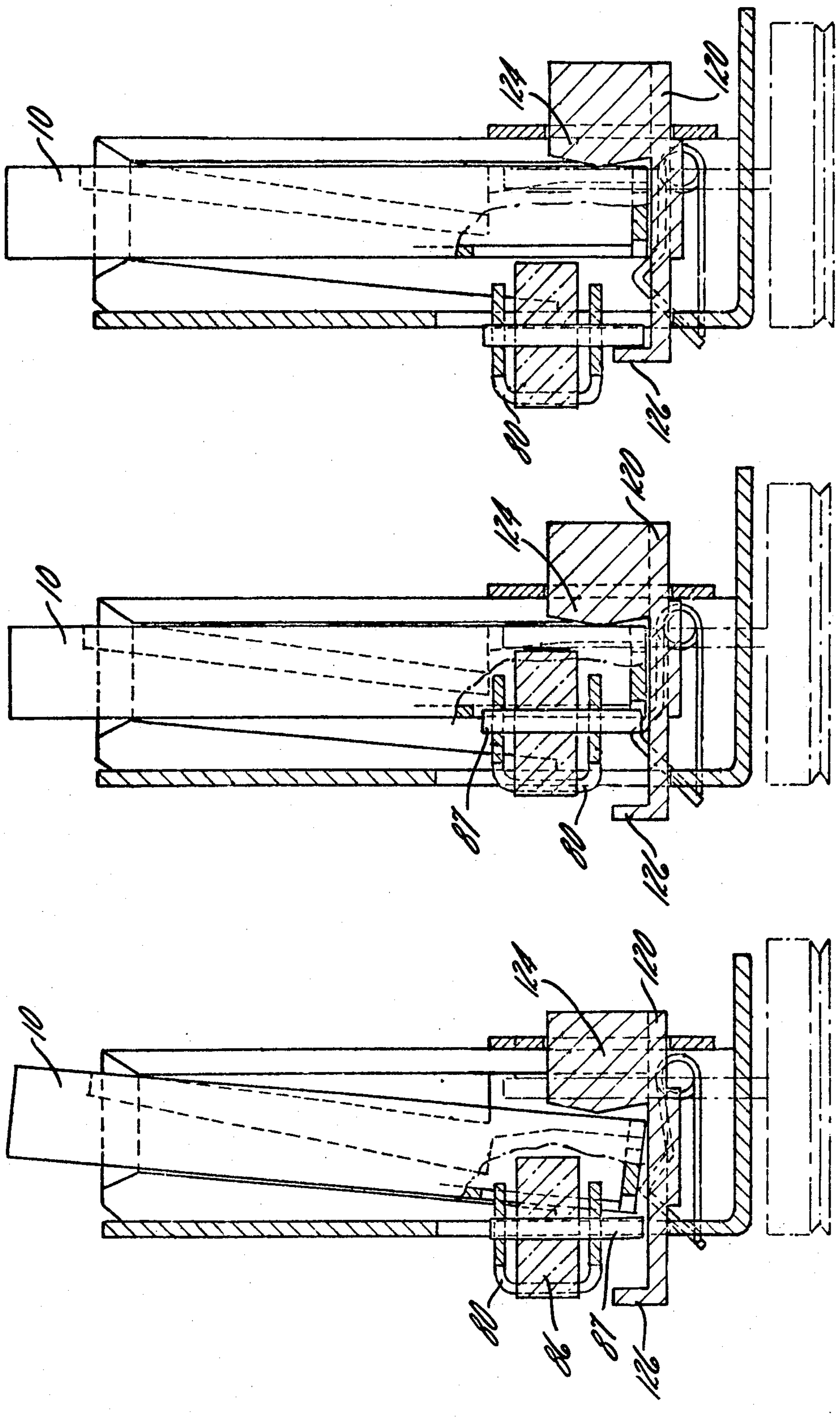
FIG. 6 is a sectional view of the apparatus taken generally along the line 6—6 of FIG. 3, and is shown with a cartridge inserted therein.
FIG. 7 is a sectional view similar to FIG. 6, particularly illustrating the apparatus in its operative position.
FIG. 8 is a sectional view similar to FIG. 6, particularly showing the cartridge in its operative position to be played, while the pressure roller is at least partially retracted.

To permit initial insertion of the cartridge 10 into the apparatus 40, and referring to FIGS. 4, 5, 5A and 5B, the apparatus is provided with a pair of cartridge side guides 60 and 62 each having projections 64 and 66 with respective faces 64′, 66′ which together define an angularly disposed cartridge track 68 that is adapted to slidingly receive the cartridge 10. Since the tracks 68 are located on opposite sides to cooperate with the side portions of the cartridge, it is seen that the cartridge may be inserted angularly into the apparatus as is shown in FIG. 5, without resistance during its inward movement. Turning now to FIGS. 1 and 6A, the opposite side portions of the cartridge that cooperate with the tracks 68 are provided with an angularly disposed recess 70 extending a major portion along the side of the cartridge. Near the inward end portion of the cartridge, the recess has a portion defining step 72 generally perpendicular to the plan of the principal walls. An extension 74 of the recess continues from the step 72 to the inward end of the cartridge as is shown in FIGS. 1, 5 and 7.

Referring to FIGS. 4 and 5, each of the guides 66 terminates at a generally horizontal step 76 which is approximately opposite the steps 72 of the cartridge when it is inserted in its first position in the apparatus. The configuration of the recesses and steps of the cartridge as well as the guide faces 64′, 66′ and the step 76 are adapted to permit insertion of the cartridge to the first position generally without resistance at the inclined or angled orientation and are also adapted to permit rocking or transverse movement of the cartridge toward the sound head, tape guide and tape guide capstan for operation of the playback apparatus, Thus, and referring to FIG. 5, the lower portion of the cartridge is adapted to move toward the right as shown so that the principal face or wall of the cartridge near the sound head 52 will move toward the right permitting the playback elements to penetrate the apertures in the cartridge and place the cartridge into operative position, herein defined as the second position. When the cartridge is in the second position, the steps 72 of the cartridge and the step 76 on the apparatus guide will also be in contacting relation. In this connection, the depth and angle of each of the recesses 70 of the cartridge are positioned to permit full transverse movement of the cartridge toward the sound head, tape guide and tape drive capstan. It should be understood that during insertion of the cartridge, the extension 74 of the recess of the cartridge contacts the faces 66' and thereby prohibits the rocking or transverse movement toward the sound head until the cartridge is inserted to substantially its full depth of penetration into the apparatus.

To initially move the cartridge from its inserted first position transversely toward the operative second position, the apparatus 40 is provided with a lever 80 that is pivotably mounted on the chassis 42 by means of a pin 84. Mounted by means of a pin 87 at the outer end of the member 80 is a rotatable, preferably rubber or rubberlike pressure roller 86 which is adapted to form a nip with the tape drive capstan.

The member 80 is provided with a spring 88 which biases the end portion of the member having the pressure roller toward the cartridge as is shown in FIGS. 3A and 7. The pressure roller 86 on the member 80 is adapted to penetrate the aperture 30 of the cover and preferably the aperture 30 is large enough to provide clearance such that the pressure roller 86 does not contact the casing or cover of the cartridge during the pivoting movement of the member toward the cartridge or after the cartridge is in its playing position.

Figure 7B:
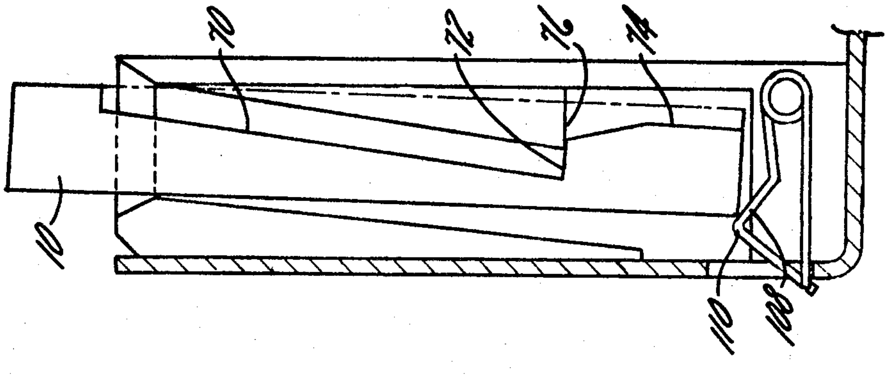
FIGS. 7A and 7B are fragmentary views showing the apparatus in different operating positions.
Figure 7A:
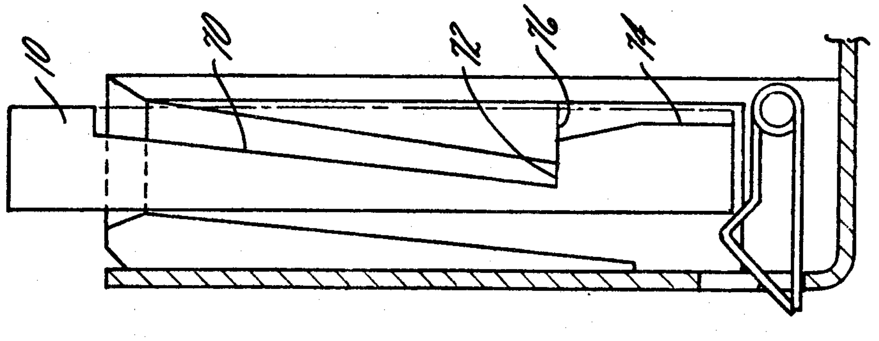
Figure 5B:
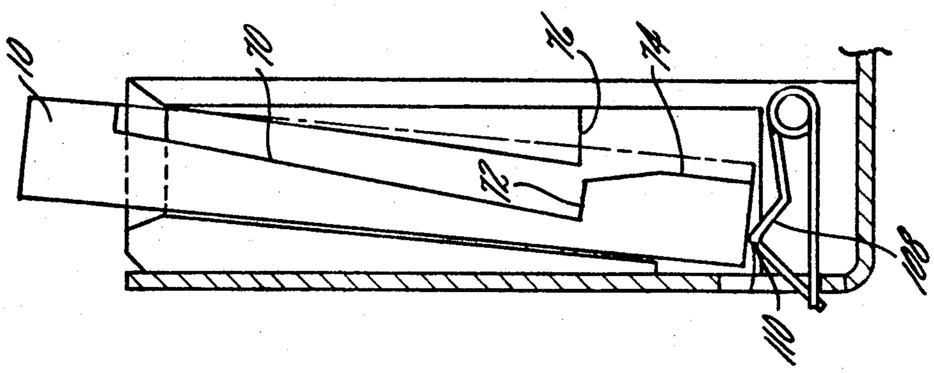
FIGS. 5A and 5B are fragmentary views illustrating different operating positions of the apparatus.
Figure 5A:
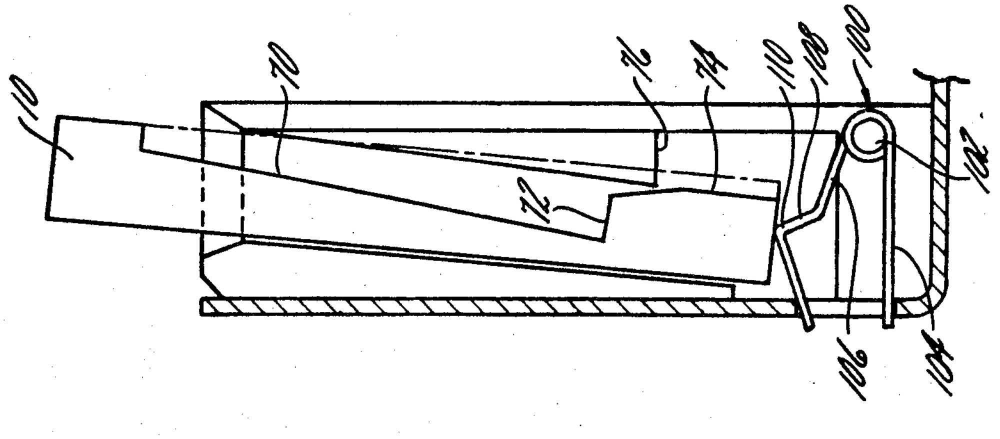

To initially provide the rocking or transverse movement of the cartridge, the member 80 has a projection 90 which provides two functions, one of which is to initially contact the cover and initiate movement of the cartridge from the first position toward the operative second position (shown in FIGS. 7 and 7A). As will more clearly be understood from the ensuing portions of the specification, the projection 90 only initially starts the rocking or transverse motion of the cartridge, and other elements within the apparatus continue the transverse movement toward the operative second position as well as hold the cartridge in the second position. With this arrangement, the member 80 is clear of the cartridge casing when the cartridge is in its second position and the pressure roller 86 is resiliently held against the tape and bears upon the tape drive capstan.

To hold the member 80 in a retracted or cocked condition, the apparatus is provided with a pivotable element 92 which is adapted to cooperate with the projection 90 of the member 80. When the cartridge is incrementally moved inwardly beyond the first position, it contacts the pivotable element 92, pivots it, and thus uncocks or releases the member 80. Due to the force of the spring 88, the member 80 moves toward the cartridge and the projection 92 engages the cartridge and starts it moving toward the operative second position hereinbefore described. As shown in FIGS. 2 and 3, the pivotable element 92 pivots around a pin 94 mounted to the chassis 42 and has a vertical wall portion that is adapted to contact the projection 90 and thereby hold the spring biased member 80 in its outward position (shown in FIGS. 3) so that the cartridge may be inserted into the apparatus to the first position without interference. The pivotable element 92 also has a horizontal portion 94 with a boss 96 positioned adjacent the inward end of the cartridge 10 when it is in its first position. A spring 98 associated with the chassis 42 is adapted to normally bias the pivotable element 92 upwardly so that the element 92 normally holds the member 80 away from the cartridge as shown in FIG. 3.

Responsive to further incremental inward movement of the cartridge, however, caused by an operator pushing downwardly on the exposed top portion of the cartridge, the cartridge contacts the boss 96 and thereby pushes downwardly on the pivotable member 92 which enables the vertical portion of the pivotable element to move out of contact with the projection 90 of the member and permit the projection to contact the cover of the cartridge and start the cartridge moving toward its operative second position.

To complete the transverse or rocking movement of the cartridge toward the operative second position having been initially started by the member 80, a pair of wire springs 100 are provided adjacent each of the cartridge side guides 60, 62 of the apparatus. As is most clearly shown in FIGS. 3 and 4, the springs are coiled around pins 102 connected to the side guides 60, 62 and have one end 104 bearing against the chassis 42, while the other end 106 is adapted to contact the inner end portion of the cartridge when it is inserted in the apparatus. As shown in FIG. 4, as well as FIGS. 5–8, the end 106 of each spring has a sharply upwardly angled portion 108 terminating in an apex 110 which contacts the inward end surface of the cartridge when it is inserted into the apparatus.

After the cartridge has been inserted to its first position within the apparatus and, subject to further incremental movement inwardly thereof which is effective to release the member 80 that initially transversely moves the cartridge toward the operative second position, the force of the springs 100 is effective to continue and complete the transverse movement as well as hold the cartridge firmly in its operative second position. Referring to FIGS. 5A, 5B, 7A and 7B, it is seen that when the cartridge is incrementally moved inwardly from its first position, the end surface contacts the apex 110 of each spring 100 and depresses it. When the member 80 starts the rocking or transverse movement, the corner of the cartridge defined by the end surface and the principal wall away from the sound head transversely passes by the apex 110 and, due to the resilience of each spring 100, this corner comes in contact with the sharply angled portion 108 which creates a component of force in both the transverse and vertically upward directions. The transverse force component created by the sharply angled portion 108 of each spring 100 moves the cartridge transversely to its second position where the tape guide, tape drive capstan, and sound head penetrate the respective apertures of the cartridge, holds it in that position, and the upward force component maintains the steps 72 of the cartridge and the steps 76 of the guide 66 in firm contact for precise cartridge alignment as it is brought to the second position. As previously described, the pressure roller 86 also penetrates the opposite principal wall to press against the tape and the tape drive capstan.

In accordance with another aspect of the present invention, and referring to FIG. 3, a switch 114 may be provided adjacent the member 80, so that when the cartridge is transversely moved to the operative second position, the switch, which is connected to the electric circuit of the motor 44, is closed to start the apparatus generally simultaneously with the cartridge reaching its operative second position. It should be understood, however, that the switch 114 may be operably connected to the other of the moving elements of the apparatus, such as the pivotable element 92 or the like.

To remove the cartridge from the apparatus, it is transversely moved in the opposite direction from the operable second position back to the first position which permits it to be easily lifted from the apparatus. In accordance with this aspect of the present invention, and referring to FIGS. 2, 3 and 6-8 a transversely slidable element 120 is provided adjacent the tape drive capstan 50 and pressure roller 86. The element 120 extends across the bottom face of the cartridge and has an upwardly extending abutment 122 adapted to contact the principal wall of the cartridge adjacent the sound head and tape drive capstan. On the opposite end portion of the transversely slidable element 120 is a smaller upwardly directed flange 124 adapted to contact the pin 87 upon which the pressure roller 86 is rotatably secured. As clearly shown in FIGS. 6–8, the face of the abutment 124 has an inclined surface adapted to permit insertion of the cartridge toward its first position substantially without interference from the abutment. Thus, when the member 80 is retracted away from the cartridge, it contacts the flange 124 and transversely slides the element 120 causing the element abutment 124 to forcibly move the cartridge away from its operative second position toward the first position. During the course of the cartridge's movement, it deflects the wire springs 100 until the corner of the cartridge passes in the reverse direction the apex 110 of the springs and, at that point, the ends 106 of the springs cause the cartridge to spring upwardly to its first position. Generally simultaneously with the retraction of the member 80, the pivotable member 92 is permitted to return to its normally upwardly biased position which effectively holds the member 80, by means of the projection 90 thereon in its retracted position. Thus, the cartridge is free to be lifted from the apparatus.

To retract the member 80 which is operably connected to the transversely slidable element 120 which moves the cartridge from its operable second position back to the first position, the end of the member 80 opposite the end having the pressure roller 86 is provided with a friction and wear reducing roller 130 shown in FIGS. 2 and 3, which cooperates with a sliding mechanism, indicated generally at 132 in FIGS. 3 and 3A. The mechanism 132 is slidably connected to the chassis 42 by means of one or more pins 134 cooperating with elongated vertical slots (not shown) in the mechanism. The mechanism 132 extends vertically to an elevation slightly higher than the level of the top surface of the cartridge when it is inserted in the apparatus. When an operator manually depresses a push button or the like fixed to the slide mechanism 132, an angularly disposed surface (not shown, but well known in the art) contacts the roller 130 of the member 80 and causes the member to retract away from the cartridge as the slide mechanism is depressed. Thus, when it is intended to remove the cartridge from the apparatus, an operator depresses the slide mechanism and through the interaction of the member 80, transversely sliding elements 120 and wire springs 100, causes the cartridge to be returned to its first position available for easy removal.

It will be appreciated that the tape transport apparatus of this invention provides a number of the important features. Among these features is the ability of the cartridge to be inserted into the apparatus substantially unimpeded. Additionally, all of the tape drive, tape guide and sound head elements penetrate the cartridge generally simultaneously, with a relatively small amount of manual force being required to insert the cartridge to its playing position. The interaction of the movement of the cartridge and the operation of electrical switches achieves automatic starting of the tape transport apparatus as an incident to the movement of the cartridge to its playing position. Finally, the cartridge can be easily removed from its playing position and ejected by push button operation and the transport is automatically stopped as an incident thereto.

Other advantages and features of the present invention will be apparent to those skilled in the art.

What is claimed is:

1. A tape transport apparatus for magnetic tape cartridges in which the tape is exposed through apertures in opposed principal walls for cooperation with a sound head, tape drive capstan and pressure roller, mounted in said apparatus;

said transport apparatus including opposed guides for slidingly receiving a cartridge inserted inwardly edgewise and guiding it substantially in its own plane to a first position wherein the exposed tape is approximately opposite the location of said sound head, tape drive capstan and pressure roller;

said apparatus including a member for initially moving said cartridge transversely toward a second position, responsive to further incremental movement of the cartridge inwardly of said apparatus, in which said sound head and tape drive capstan penetrate one wall of said cartridge into operative contact with said tape, said pressure roller being carried by said member through an aperture in the opposite principal wall to press said tape against said tape drive capstan.

2. Apparatus as defined in claim 1, wherein said apparatus is adapted to slidingly receive said cartridge to said first position generally without resistance during its movement thereto.

3. Apparatus as defined in claim 1 wherein resilient means supplementally urge and complete the movement of said cartridge toward and thereafter retain said cartridge in said second position responsive to initial transverse cartridge movement caused by said member.

4. Apparatus as defined in claim 3 wherein said resilient means are adapted to supplementally urge said cartridge toward said second position after initial transverse cartridge movement caused by said member, said resilient means being adapted to oppose said incremental inward cartridge movement until said member initiates said transverse cartridge movement.

5. Apparatus as defined in claim 4 wherein said resilient means comprises at least one wire spring extending transversely across the inward end of said cartridge when said cartridge is in said first position, said wire spring having an upwardly directed apex contacting the inward end of said cartridge when said cartridge is in said first position and an inwardly angled portion adapted to engage and urge a corner of said cartridge defined by the inward end and one of said principal walls responsive to said initial transverse cartridge movement toward said second position, said inwardly angled portion being effective to apply a component of force upon said corner of said cartridge in the transverse direction toward said second position and in a direction opposing inward movement of said cartridge.

6. Apparatus as defined in claim 1 including an apparatus drive motor, said member adapted to initially move said cartridge transversely toward said second position also acts in the course of its movement to actuate a switch operably connecting said drive motor, so that said apparatus begins to drive said tape substantially when said cartridge reaches said second position.

7. Apparatus as defined in claim 1 including a pivotable element positioned below said cartridge when said cartridge is in said first position and a biasing means normally urging said member toward said cartridge in the direction of said transverse movement toward said second position, said pivotable element being adapted to hold said member from moving toward said cartridge and thereafter release said member to initially move said cartridge toward said second position responsive to said further incremental movement of said cartridge inwardly of said apparatus.

8. Apparatus as defined in claim 7 wherein said member biasing means normally urging said member toward said second position is effective, when said member is released, to maintain said pressure roller against said tape and tape drive capstan after said member initially moves said cartridge toward said second position, said member being out of contact with said cartridge after said cartridge has reached said second position.

9. Apparatus as defined in claim 7 wherein said pivotable element is spring biased to oppose said further inward incremental movement of said cartridge and to oppose releasing said member for moving toward said cartridge.

10. Apparatus as defined in claim 9 including a transversely slidable element positioned adjacent the inward end portion of said cartridge and operably connected to said member, said slidable element being adapted to contact said cartridge and move said cartridge from said second to said first position when said member is retracted away from said cartridge.

11. Apparatus as defined in claim 10 including a manually operable rejecting means operably connected to said member, whereby, responsive to movement of said rejecting means, said member is retracted away from said cartridge, said retraction of said member moving said sliding element to transversely move said cartridge from said second to said first position, and permitting said cartridge to be easily removed from said apparatus, said retraction of said member being effective to enable said pivotable element to return to its biased upward position adapted to hold said member from moving toward said cartridge.

12. Apparatus as defined in claim 11 wherein said rejecting means comprises a sliding mechanism having an upper exposed portion adapted to be manually depressed, said sliding mechanism having an inclined slot engaging said member, such that depressing said slide mechanism retracts said member away from said cartridge.

13. Apparatus as defined in claim 1 wherein said cartridge has a recess located at end side thereof adapted to cooperate with said opposed guides, said guides limiting said transverse movement toward said second position until said cartridge is incrementally moved inwardly after having reached said first position.

14. Apparatus as defined in claim 13 wherein said cooperating guides and recesses prevent outward movement of said cartridge when in said second position, said resilient means urging said cartridge in the transverse direction toward said second position and outwardly to maintain contact between said guides and recesses to maintain a firm, motion free fit when said cartridge is in said second position.

15. Apparatus as defined in claim 1 wherein said sound head has tape guides associated therewith for guiding the exposed tape relative to the sound head.

16. A tape transport apparatus for magnetic tape cartridges in which the tape is exposed through apertures in opposed principal walls for cooperation with a sound head and tape drive capstan, each of which is at a fixed location in said apparatus, and a pressure roller;

said transport apparatus including opposed guides for slidingly receiving a cartridge inserted inwardly therein substantially in its own plane to a first position wherein the exposed tape is approximately opposite the location of said sound head and tape drive capstan;

said apparatus further including independent means for initially starting and completing transverse movement of said cartridge to a second position wherein said sound head and tape drive capstan penetrate one principal wall of said cassette into operative contact with said tape, one of said independent means including a member supporting said pressure roller for penetrating an aperture in the opposite principal wall to press said tape against said tape drive capstan when said cartridge is in said second position, said means for completing said transverse movement of said cartridge also being effective to hold said cartridge in said second position.

17. A tape transport apparatus for magnetic tape cartridges in which the tape is exposed through apertures in opposed principal walls for cooperation with a sound head and tape drive capstan, each of which is at a fixed location in said apparatus, and a movably mounted pressure roller;

said apparatus including opposed guides for slidingly receiving a cartridge inserted inwardly therein substantially in its own plane to a first position wherein the exposed tape is approximately opposite the location of said sound head and tape drive capstan;

said apparatus including a normally cocked, pivotable member which is released responsive to further incremental inward movement of said cartridge, and initially moves said cartridge transversely toward a second position wherein said sound head and tape drive capstan penetrate apertures in one principal wall of said cassette, said pressure roller being carried by said member through an aperture in the opposite principal wall to press said tape against said tape drive capstan;

said apparatus further including resilient means for completing said transverse movement of said cartridge and for holding said cartridge in said second position.

* * * * *